United States Patent Office 3,131,176
Patented Apr. 28, 1964

3,131,176
MANUFACTURE OF WATER-SOLUBLE HYDROXY-
ALKYL CELLULOSE ETHERS
Eugene D. Klug, Wilmington, Del., assignor to Hercules
Powder Company, Wilmington, Del., a corporation of
Delaware
No Drawing. Filed Apr. 13, 1960, Ser. No. 21,867
16 Claims. (Cl. 260—231)

The present invention relates to a process of preparing water-soluble hydroxyalkyl cellulose ethers and more particularly to such a process wherein the hydroxyalkylation is carried out in two stages.

Although this invention is applicable to the preparation of water-soluble hydroxyalkyl cellulose ethers in general, for the sake of clarity and simplicity it will be described hereinafter for the most part with reference to preparing water-soluble hydroxyethyl cellulose which is a widely used commercial product.

MS is used herein to mean the moles of hydroxyalkylating agent (e.g., alkylene oxide) combined per anhydroglucose unit of the cellulose molecule and is determined by the familiar Zeisel-Morgan method.

For a number of years hydroxyethyl cellulose has been prepared by reacting cellulose with a hydroxyalkylating agent in the presence of an alkali, neutralizing the alkali, purifying and drying the hydroxyethyl cellulose (see Klug and Tennent U.S.P. 2,572,039). Usually ethylene oxide and aqueous sodium hydroxide are used. Heretofore, a major problem has been the purification of the hydroxyethyl cellulose product. For most applications the hydroxyethyl cellulose product must be purified. In the prior art processes at least 30%–40% sodium hydroxide based on the cellulose must be used to obtain the desired degree of hydroxyethylation and uniformity of hydroxyethyl cellulose. Purification comprises removing compounds, such as, e.g., ethylene glycol and polyoxyethylene glycols, formed by side reactions entered into by the ethylene oxide. These are readily removed by water, organic solvents, or mixtures of these two. However, the major impurity is sodium hydroxide and its removal is far more difficult. At an MS above about 1.0, particularly 1.5–3.0, hydroxyethyl cellulose is highly soluble in water and it is substantially soluble to highly soluble in aqueous alcohols such as methanol and ethanol at concentrations where these solvents will dissolve appreciable amounts of sodium salts. Therefore, neither water nor aqueous alcohols can be used to purify the hydroxyethyl cellulose product.

Thus the purification of hydroxyethyl cellulose of an MS above about 1.0 is the most difficult task in its manufacture, and this has been well known in the art for quite some time. Heretofore the most satisfactory purification solvent has been aqueous acetone. Insofar as I am aware, H. Froment has published the only important papers regarding water-soluble hydroxyethyl cellulose, and these are in Ind. Chem. Belge. 23, 3–14, 115–121 (1958). The following statement appears on page 3 of this publication:

"The ethers thus obtained are contaminated with glycol, polyalkylene oxide, caustic solution and diluent. The removal of the alkali (usually sodium hydroxide) is most difficult. It would be possible to wash it out with water, except for the fact that the hydroxyalkyl ethers themselves dissolve in dilute sodium hydroxide solution at substitutions higher than roughly 0.2 mol-alkylene oxide/$C_6H_{10}O_5$. Even if the sodium hydroxide is first neutralized, water alone cannot be used if there is more than .75 to 1 mol alkylene oxide/$C_6H_{10}O_5$, since the ether would dissolve together with the solvent. Under these circumstances, mixtures of water and a nonsolvent (e.g., acetone) are used for washing. Washing becomes progressively more difficult as the substitution and consequently the solubility increase. We must therefore resort to purification in solution (e.g., by ion exchange or dialysis)."

Thus the best known prior art purification process (aqueous acetone) leaves much to be desired, and purification in solution by dialysis or ion exchange is very expensive and commercially impractical. As a matter of fact, purification by prior art processes has been so difficult that commercially available hydroxyalkyl cellulose ethers contain as much as 8% ash (as sodium sulfate) and this high ash content has seriously limited the use of water-soluble hydroxyalkyl cellulose ethers for several important applications. Another serious problem encountered with water-soluble hydroxyalkyl cellulose ethers is that because of the relatively high salt content the ethers swell so much and so readily that filtration and handling are very difficult and in some cases the ethers are apt to become doughy.

An object of the present invention is to provide a process of preparing water-soluble hydroxyalkyl cellulose ethers. A further object is to provide such a process wherein purification of the ethers is greatly simplified. A still further object is to provide such a process wherein the hydroxyalkylation is carried out in two stages. Another object is to provide such a process wherein the drawbacks of the prior art are either eliminated or at least minimized. These and other objects will be apparent from the description of this invention given hereinafter.

The above and other objects are accomplished according to this invention by carrying out the process which comprises (1) a first stage wherein cellulose is hydroxyalkylated in the presence of an alkali and water to an MS not exceeding 0.8 and substantially all of the alkali and other impurities are removed, the alkali/cellulose and water/cellulose ratios being 0.2/1–0.8/1 and 0.8/1–4.0/1, respectively, (2) a second stage wherein hydroxyalkylation of the resulting partially hydroxyalkylated and purified cellulose is continued in the presence of alkali using an alkali/hydroxyalkyl cellulose ratio of 0.005/1–0.1/1.

The main basis of this invention is the discovery that by hydroxyalkylating cellulose in two stages a large amount of caustic can be advantageously used in the first stage to hydroxyalkylate the cellulose to an MS just short of that where it becomes appreciably water soluble since the excess caustic can be efficiently removed with practically no loss of hydroxyalkyl cellulose simply by washing with water or aqueous alcohols, and a surprisingly small amount of caustic (about one-tenth that of the prior art) is sufficient in the second stage to efficiently hydroxyalkylate to the water-soluble MS the partially hydroxyalkylated and purified first stage product. In the second stage where the hydroxyalkylated product is so highly soluble there are practically no salt impurities, because most of them were easily removed from the relatively water-insoluble first stage product. In fact, the salt impurities in the second stage hydroxyalkylated product are so low that for most uses no purification is required and when the second stage product is purified even only a single wash gives a very low sulfate ash, e.g., one wash gave 1.4% and two washes gave 0.9% sulfate ash as compared with 4.1% sulfate ash after washing a corresponding hydroxyalkylated product of the prior art 7 times (see Examples 1 and 2 hereinafter).

In most instances the present invention entirely eliminates the prior art problem of the hydroxyalkylated product swelling or becoming doughy and in other cases it at least substantially reduces the problem. This problem is described in greater detail hereinbefore.

In order to prepare the products of this invention, it is necessary that the first stage hydroxyalkyl cellulose product be very uniform such that it dissolves substantially completely in 5% aqueous sodium hydroxide solution to give uniform or smooth solutions with a minimum of structure. In order to accomplish this, I have found it necessary to use in the first stage an alkali/cellulose ratio of 0.2/1–0.8/1 and a water/cellulose ratio of 0.8/1–4.0/1. Still better results are obtained if the alkali/cellulose ratio is 0.3/1–0.5/1 and the water cellulose ratio is 1.2/1–2.5/1 in the first stage. An additional requirement for accomplishing this uniformity of the first stage product is to provide excellent contact between the cellulose and other components of the reaction mixture used in the first stage, e.g., the alkali, hydroxyalkylating agent, water, and diluent if any. This required contact is realized by employing the proper mechanical conditions such as vigorous and thorough agitation of the hydroxyalkylation reaction mixture. The artisan knows very well how to accomplish this agitation.

The following examples illustrate various embodiments of this invention, but they are not intended to limit the invention beyond its scope as defined in the claims of this application. Percent, parts, and ratios in the examples and elsewhere herein are by weight unless otherwise indicated. All ratios involving cellulose or hydroxyalkyl cellulose are based on the air dry weight thereof. All ratios involving alkali are based on sodium hydroxide. Although the terms are reasonably well understood in this art, perhaps it would be desirable to define what I mean in this application by "slurry process" and "nonslurry process." By slurry process I mean one in which an inert organic diluent or hydroxyalkylating reaction medium is used. Such diluents are discussed more fully hereinafter. By nonslurry process I mean one in which the hydroxyalkylation is carried out in the absence of such diluent. Example 39 hereinafter is representative of a nonslurry process, whereas all the other examples hereinafter are representative of slurry processes.

Examples 1–39 below illustrate the superiority in ease of purification of my process and purity of product over that of the prior art. All these products made in accordance with this invention had much lower sulfate ash and swelled appreciably less than products made in accordance with the prior art (Control).

EXAMPLE 1

Control

To a vigorously stirred slurry of 1 part finely divided cotton linters in 1.3 parts water and 11 parts tertiary butanol was added 0.6 part 50% NaOH. This was stirred for ½ hour after which 1.3 parts ethylene oxide in 1.1 part tertiary butanol were added and the reaction mixture was heated 4.5 hours at 50° C.–60° C. The batch then was neutralized with propionic acid and the reaction liquor was filtered off. The filter cake was given seven 15-minute washes with agitation using 8.5 parts 80% tertiary butanol per wash. The resulting product had an ash content (as sodium sulfate) of 4.1%. The product had a hydroxyethyl MS of 2.5.

EXAMPLE 2

Present Invention

*First stage.*—A batch of hydroxyethyl cellulose of MS 0.43 was prepared by substantially the same procedure as in Example 1 except for the use of only 0.4 part ethylene oxide per part of hydroxyethyl cellulose. This product was purified by washing with 70% aqueous methanol and then dried at 70° C.

*Second stage.*—One part of the purified dried product from the first stage was stirred in 10 parts tertiary butanol and 1.6 parts water. To this slurry was added 0.06 part 50% NaOH and after stirring 1 hour, 1.3 parts ethylene oxide in 1.1 parts tertiary butanol was added. The reaction was heated 1 hour at 50° C. followed by 3 hours at 60° C. At the end of the reaction, the NaOH was neutralized with propionic acid and the reaction liquor filtered off. Half of the filter cake was dried without further treatment; its ash content as sodium sulfate was 2.4%. The other half was given two washes using 13 parts 80% aqueous tertiary butanol per part hydroxyethyl cellulose for each wash. The sulfate ash after the first and second wash was 1.4% and 0.9%, respectively.

EXAMPLE 3

Present Invention

Using substantially the same conditions as in Example 2, except that instead of drying the first stage hydroxyethyl cellulose, it was filtered to slightly below the water content desired for the second stage, substantially the same results were obtained as in Example 2. The water content to which the first stage product was reduced was such that when the aqueous alkali was added for the second stage the total amount of water was the amount desired for the second stage hydroxyethylation.

In Examples 2 and 3 the major portion of the ash was removed from the first stage product which is easily purified at the low MS of 0.43. In Example 1 it is seen that after vigorous washing the ash content was still 4.1%. Furthermore, the material was so highly swollen that it was difficult to handle.

EXAMPLES 4–36 (TABLE 1)

First Stage

*Examples 4–10.*—To a vigorously stirred slurry of one part by weight finely divided cotton linters in 14.6 parts isopropanol and 1.6 parts water was added 0.8 part 50% aqueous sodium hydroxide. The slurry was stirred for 1 hour at room temperature after which 0.15 part ethylene oxide in 0.13 part isopropanol was added. With continued stirring the slurry was heated 5 hours at 60° C. after which the sodium hydroxide was neutralized with acetic acid and the product purified by washing with 70% aqueous methanol, dehydrated with anhydrous methanol and dried at 70° C. It had an MS of 0.24 and very good uniformity as indicated by its good solubility in 5% aqueous NaOH.

*Examples 11–36.*—Using substantially the same conditions, except more ethylene oxide, as for Examples 4–10 above, first stage hydroxyethyl cellulose products of MS 0.43 and 0.68 were prepared.

Second Stage

Each of the first stage hydroxyethyl cellulose products were further hydroxyethylated in this second stage using substantially the same conditions as in the first stage except for sodium hydroxide and ethylene oxide and other conditions shown. After a hydroxyethylation reaction period of 1 hour at 55° C. followed by 3 hours at 60° C., the products were neutralized with propionic acid and purified by washing 3 times with 80% aqueous tertiary butanol using approximately 10 parts per part of hydroxyethyl cellulose for each wash. The sulfate ash content fell within the range of 0.5%–1.0%.

Further details are given in Table 1 which follows.

TABLE 1 (EXAMPLES 4-36)

| Example No. | First Stage, MS | Second Stage | | | | |
|---|---|---|---|---|---|---|
| | | Ratios to HEC[1] | | | HEC[3] | |
| | | NaOH | H$_2$O | EO[3] | MS | Solubility[2] |
| 4 | 0.24 | 0.030 | 1.6 | 1.1 | 1.57 | Fair. |
| 5 | 0.24 | 0.030 | 2.0 | 1.1 | 1.71 | Do. |
| 6 | 0.24 | 0.045 | 1.2 | 1.1 | 1.72 | Good. |
| 7 | 0.24 | 0.045 | 1.6 | 1.1 | 1.89 | Do. |
| 8 | 0.24 | 0.045 | 2.0 | 1.1 | 1.89 | Excellent. |
| 9 | 0.24 | 0.045 | 2.4 | 1.1 | 1.99 | Do. |
| 10 | 0.24 | 0.060 | 2.4 | 1.1 | 2.55 | Do. |
| 11 | 0.43 | 0.015 | 1.2 | 1.1 | 1.52 | Fair. |
| 12 | 0.43 | 0.015 | 1.6 | 1.1 | 1.53 | Do. |
| 13 | 0.43 | 0.015 | 2.0 | 1.1 | 1.45 | Do. |
| 14 | 0.43 | 0.023 | 0.8 | 1.1 | 1.52 | Good. |
| 15 | 0.43 | 0.023 | 1.2 | 1.1 | 2.05 | Excellent. |
| 16 | 0.43 | 0.023 | 1.6 | 1.1 | 2.04 | Do. |
| 17 | 0.43 | 0.023 | 2.0 | 1.1 | 2.16 | Do. |
| 18 | 0.43 | 0.023 | 2.4 | 1.1 | 2.01 | Do. |
| 19 | 0.43 | 0.030 | 0.8 | 1.1 | 1.66 | Fair. |
| 20 | 0.43 | 0.030 | 1.2 | 1.1 | 1.79 | Excellent. |
| 21 | 0.43 | 0.030 | 1.6 | 1.1 | 2.04 | Do. |
| 22 | 0.43 | 0.030 | 2.0 | 1.1 | 1.86 | Do. |
| 23 | 0.43 | 0.030 | 2.4 | 1.1 | 2.43 | Do. |
| 24 | 0.43 | 0.045 | 0.8 | 1.1 | 2.1 | Good. |
| 25 | 0.43 | 0.045 | 1.2 | 1.1 | 2.7 | Excellent. |
| 26 | 0.43 | 0.045 | 1.6 | 1.1 | 2.96 | Do. |
| 27 | 0.43 | 0.045 | 2.0 | 1.1 | 2.87 | Do. |
| 28 | 0.43 | 0.045 | 2.4 | 1.1 | 2.24 | Do. |
| 29 | 0.68 | 0.015 | 2.0 | 0.92 | 1.61 | Excellent. |
| 30 | 0.68 | 0.023 | 2.0 | 0.92 | 1.83 | Do. |
| 31 | 0.68 | 0.030 | 0.8 | 0.92 | 1.95 | Fair. |
| 32 | 0.68 | 0.030 | 1.2 | 0.92 | 2.29 | Good. |
| 33 | 0.68 | 0.030 | 1.6 | 0.92 | 2.28 | Excellent. |
| 34 | 0.68 | 0.030 | 2.4 | 0.92 | 2.27 | Do. |
| 35 | 0.68 | 0.045 | 1.6 | 0.92 | 2.55 | Do. |
| 36 | 0.68 | 0.045 | 2.0 | 0.92 | 2.61 | Do. |

[1] Ratios to air dry HEC prepared in the first stage.
[2] Based on undissolved fiber and smoothness of a 2% aqueous solution of the HEC.
[3] HEC is hydroxyethyl cellulose and EO is ethylene oxide.

EXAMPLES 37 AND 38 (TABLE 2)

These examples show that organic bases may be used instead of alkali metal hydroxides (e.g., sodium hydroxide) as the alkali for the second stage. Except as otherwise indicated the conditions and results were substantially the same as those for Example 2 above. The use of organic bases has the advantage that any of the base remaining in the second stage hydroxyalkyl cellulose leaves no ash residue.

Table 2 which follows gives further details.

TABLE 2 (EXAMPLES 37 AND 38)

| Example No. | First Stage, MS | Second Stage | | | | |
|---|---|---|---|---|---|---|
| | | Ratios to HEC[1] | | | HEC[3] | |
| | | TBAH[3] | H$_2$O | EO[3] | MS | Solubility[2] |
| 37 | 0.43 | 0.05 | 2.3 | 1.3 | 1.33 | Good. |
| 38 | 0.43 | 0.11 | 1.6 | 1.3 | 2.05 | Do. |

[1] Ratios to air dry HEC prepared in the first stage.
[2] Based on undissolved fiber and smoothness of a 2% aqueous solution of the HEC.
[3] TBAH is trimethyl benzyl ammonium hydroxide; HEC is hydroxyethyl cellulose; EO is ethylene oxide.

EXAMPLE 39

This example illustrates the application of my invention to a nonslurry process, i.e., a process in which no diluent is used.

One part of hydroxyethyl cellulose of MS 0.43 which was prepared in accordance with the first stage described in Example 2 hereinbefore, was vigorously stirred in 11.5 parts of water and 0.03 part of 50% aqueous sodium hydroxide. After one hour 1.8 parts ethylene oxide was added. The reaction mixture was heated at 70° C.–75° C. for 2 hours after which it became a rubbery dough. Part of the product was precipitated in isopropanol and washed with isopropanol. It had an MS of 1.36 and good water solubility. Another portion of the rubbery dough product was neutralized by kneading acetic acid into it. It was then drum dried to a flaky product. The ash content of this product was only 2.2% as sodium sulfate.

As those skilled in this art will appreciate many variations may be made in the above conditions within the scope of this invention defined in the appended claims.

In the first stage the hydroxyalkylation may be carried out to an MS of 0.05–0.8, preferably 0.2–0.6, using an alkali/cellulose ratio of 0.2/1–0.8/1, preferably 0.3/1–0.5/1. The MS and alkali/cellulose ratio of the first and second stages are somewhat interdependent. In the second stage the minimum MS to which the cellulose can be hydroxyalkylated is that at which some substantial benefit is realized from the present invention as compared with the prior art, and usually this is an MS of about 1 or greater. However, the benefits of the invention are realized more fully if the hydroxyalkylation in the second stage is carried out to an MS of about 1.5–3. The alkali/cellulose ratio in the second stage is critical, particularly as to maximum. Although alkali/cellulose ratios of 0.005/1–0.1/1 give satisfactory results, preferably they will be 0.01/1–0.05/1. If the second stage alkali/cellulose ratio substantially exceeds about 0.1/1, the benefits of this invention are far less. As will be seen from the above examples, as the MS of the first stage product increases, the amount of alkali required for the second stage decreases; however, the higher the MS in the first stage the closer one comes to the prior art problem of purification.

Water/cellulose ratios in the second stage are satisfactory within a very wide range, e.g., about 1/1–20/1, and usually one would operate within the range of about 1.2/1–6/1.

This invention is applicable to the manufacture of any water-soluble hydroxyalkyl cellulose ether which includes hydroxyethyl cellulose, hydroxypropyl cellulose, hydroxybutyl cellulose, and mixtures of these.

The prior art has used several hydroxyalkylating agents to prepare water-soluble hydroxyalkyl cellulose ethers. These include alkylene oxides, e.g., ethylene oxide, propylene oxide, 3,4-epoxy-1-butene. All of such alkylene oxides are operable in the present invention.

While I prefer to use a slurry process, a nonslurry process is applicable. In the slurry process I may use the various materials heretofore used as diluents in slurry processes, including 3–5 carbon atom aliphatic alcohols, e.g., propyl alcohol, butyl alcohol, amyl alcohol, tertiary butyl alcohol, secondary butyl alcohol, isopropyl alcohol; acetone; dioxane and tetrahydrofuran. The amount of diluent applicable in this invention is the same as in the prior art and may be varied over a wide range (see, e.g., Klug and Tennent U.S.P. 2,572,039). In general, I may use as diluent any substantially water-miscible inert organic liquid which has low solubility for the alkali employed.

Various alkalies are applicable, including alkali metal hydroxides, e.g., sodium hydroxide, potassium hydroxide, and organic bases, e.g., trimethyl benzyl ammonium hydroxide, dimethyl dibenzyl ammonium hydroxide, tetramethyl ammonium hydroxide.

For neutralizing the alkali I may use various materials including acetic acid, hydrochloric acid, nitric acid, propionic acid, benzoic acid, and mixtures of these. Hydroxyalkylating conditions, e.g., temperature, time, purification solvents, ratio of other components of the reaction mixture, etc., are so well known in this art and so extensively represented in the literature that they need no further discussion in this application. Likewise, this applies to the types of cellulosic materials which may be used.

Although I prefer to remove all of the alkali from the hydroxyalkyl cellulose product at the end of the first stage and add fresh alkali in the second stage, I may leave in the first stage any amount of alkali up to the maximum specified for the second stage. Likewise, while one of the advantages of this invention is that it permits the preparation of products of very low ash content, the benefits of the invention are still realized in preparing products of much higher ash content, e.g., the prior art products of 5%–8% ash content. The alkali may be removed with or without neutralization.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of preparing water-soluble hydroxyalkyl cellulose ethers comprising (1) a first stage wherein cellulose is hydroxyalkylated in the presence of an alkali and water to an MS not exceeding 0.8, and alkali and other impurities are removed, the amount of alkali removed being at least enough to leave only that amount specified for the second stage, the alkali/cellulose and water/cellulose ratios being 0.2/1–0.8/1 and 0.8/1–4.0/1, respectively, (2) a second stage wherein hydroxyalkylation of the resulting partially hydroxyalkylated and purified cellulose is continued in the presence of alkali using an alkali/hydroxyalkyl cellulose ratio of 0.005/1–0.1/1 and a water/hydroxyalkyl cellulose ratio of 1/1–20/1.

2. Process of preparing water-soluble hydroxyalkyl cellulose ethers comprising (1) a first stage wherein cellulose is hydroxyalkylated in the presence of an alkali and water to an MS not exceeding 0.8, substantially all of the alkali is neutralized, and substantially all of the resulting salts and other impurities are removed, the alkali-cellulose and water/cellulose ratios being 0.2/1–0.8/1 and 0.8/1–4.0/1, respectively, (2) a second stage wherein hydroxyalkylation of the resulting partially hydroxyalkylated and purified cellulose is continued in the presence of alkali using an alkali/hydroxyalkyl cellulose ratio of 0.005/1–0.1/1 and a water/hydroxyalkyl cellulose ratio of 1/1–20/1.

3. Process of claim 1 wherein the MS of the first stage hydroxyalkyl cellulose product is 0.05–0.8.

4. Process of claim 1 wherein the MS of the first stage hydroxyalkyl cellulose product is 0.2–0.6 and the second stage alkali/hydroxyalkyl cellulose ratio is 0.01/1–0.05/1.

5. Process of claim 2 wherein the first stage alkali-cellulose and water/cellulose ratios are 0.3/1–0.5/1 and 1.2/1–2.5/1, respectively.

6. Process of claim 2 wherein the second stage hydroxyalkyl cellulose product is purified.

7. Process of claim 2 wherein prior to use in the second stage the first stage hydoxyalkyl cellulose product is dried.

8. Process of claim 2 wherein prior to use in the second stage the water content of the first stage purified, undried hydroxyalkyl cellulose product is adjusted to the desired water content.

9. Process of claim 2 wherein the alkali in the first stage is an alkali metal hydroxide and the alkali in the second stage is an organic base.

10. Process of claim 9 wherein the organic base is trimethyl benzyl ammonium hydroxide.

11. Process of claim 2 wherein the MS of the second stage hydroxyalkyl cellulose product is at least about 1.

12. Process of claim 2 wherein the MS of the first stage hydroxyalkyl cellulose product is 0.2–0.6 and the MS of the second stage hydroxyalkyl cellulose product is about 2–3.

13. Process of claim 2 wherein the water-soluble hydroxyalkyl cellulose ether is hydroxyethyl cellulose, the hydroxyalkylating agent is ethylene oxide and the alkali is aqueous sodium hydroxide.

14. Process of preparing water-soluble hydroxyethyl cellulose comprising (1) a first stage wherein cellulose is hydroxyethylated in the presence of aqueous sodium hydroxide, water and diluent to an MS not exceeding about 0.8, substantially all of the sodium hydroxide is neutralized, the resulting salts and other impurities are removed, the sodium hydroxide/cellulose and water/cellulose ratios being 0.2/1–0.8/1 and 0.8/1–4.0/1, respectively, (2) a second stage wherein hydroxyethylation of the resulting partially hydroxyethylated and purified cellulose is continued in the presence of fresh aqueous sodium hydroxide using a sodium hydroxide/hydroxyethyl cellulose ratio of 0.005/1–0.1/1 and a water/hydroxyalkyl cellulose ratio of 1.2/1–6/1.

15. Process of preparing water-soluble hydroxyethyl cellulose comprising (1) a first stage wherein cellulose is hydroxyethylated in the presence of aqueous sodium hydroxide, water and diluent to an MS of 0.2–0.6, substantially all of the sodium hydroxide is neutralized, the resulting salts and other impurities are removed, the sodium hydroxide/cellulose and water/cellulose ratios being 0.3/1–0.5/1 and 1.2/1–2.5/1, respectively, (2) a second stage wherein hydroxyethylation of the resulting partially hydroxyethylated and purified cellulose is continued in the presence of fresh aqueous sodium hydroxide using a sodium hydroxide/hydroxyethyl cellulose ratio of 0.01/1–0.05/1 and a water/hydroxyalkyl cellulose ratio of 1.2/1–6/1.

16. Process of claim 15 wherein the diluent is tertiary butanol, the first stage hydroxyethyl cellulose product is dried before use in the second stage, and the second stage hydroxyethyl cellulose product is purified.

References Cited in the file of this patent

UNITED STATES PATENTS

| | | |
|---|---|---|
| Re. 24,116 | Klug | Jan. 31, 1956 |
| 1,876,920 | Hagedorn et al. | Sept. 13, 1932 |
| 2,055,892 | Dreyfus | Sept. 29, 1936 |
| 2,891,056 | Wagner | June 16, 1959 |

OTHER REFERENCES

Ind. and Eng. Chem., volume 29, No. 1, pages 114–117.